Sept. 21, 1948.    M. A. SHRIRO ET AL    2,449,568
BATTERY MOUNT
Filed Oct. 3, 1944

INVENTOR.
MICHAEL B. KRAUS
MORRIS A. SHRIRO
BY
William D. Hall.
ATTORNEY

Patented Sept. 21, 1948

2,449,568

UNITED STATES PATENT OFFICE 2,449,568

BATTERY MOUNT

Morris A. Shriro, Elberon, and Michael B. Kraus, Jr., Red Bank, N. J.

Application October 3, 1944, Serial No. 557,042

4 Claims. (Cl. 136—173)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to battery mounts and the like.

Although, in the appended drawings and the following specification, the present invention will be illustrated as an adapter or mount for battery cells, it will be understood that such is but one embodiment thereof and said invention is not to be deemed to be limited thereto. It may be used in connection with other apparatus, such as resistors, capacitors, inductances, etc., and, therefore, may be modified accordingly within the spirit of the invention.

In some electrical devices, such as flashlights, radios and the like, special, elongated, primary cells are used. These are usually several times the length of conventional "standard" cells of similar diameter. Experience has shown that, due largely to their excessive length, these cells are often attended by ills which make their use unsatisfactory. Also, due to their non-standard size and the fact that ordinarily the demand for them is not nearly as great as for "standard" sizes, a problem of supplying these special cells, in addition to "standard" size cells, has arisen.

It is, therefore, an object of the present invention to provide an adapter which will allow "standard" size cells to be used in place of special cells in apparatus constructed to receive the latter.

It is another object to provide a mount which will allow two cells to be rapidly connected in parallel.

It is another object to provide such an adapter which is simple and inexpensive to manufacture, which will be sturdy although light in weight, and which will take up a minimum of usable space.

It is still another object to provide a battery adapter which will save raw materials and battery cells, in that with its use one small bad cell may be replaced at a time as necessary, whereas, where special large cells are used, a defect therein due to any cause requires replacement of the entire special large cell.

Figure 1:
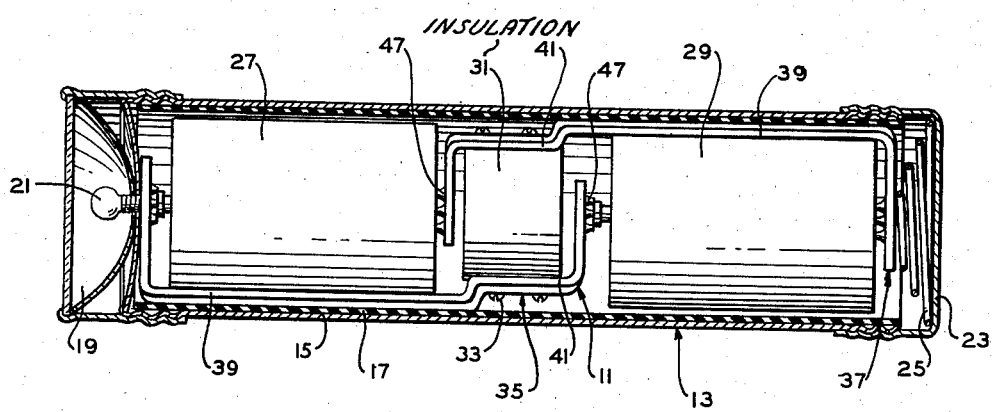
Figure 2:
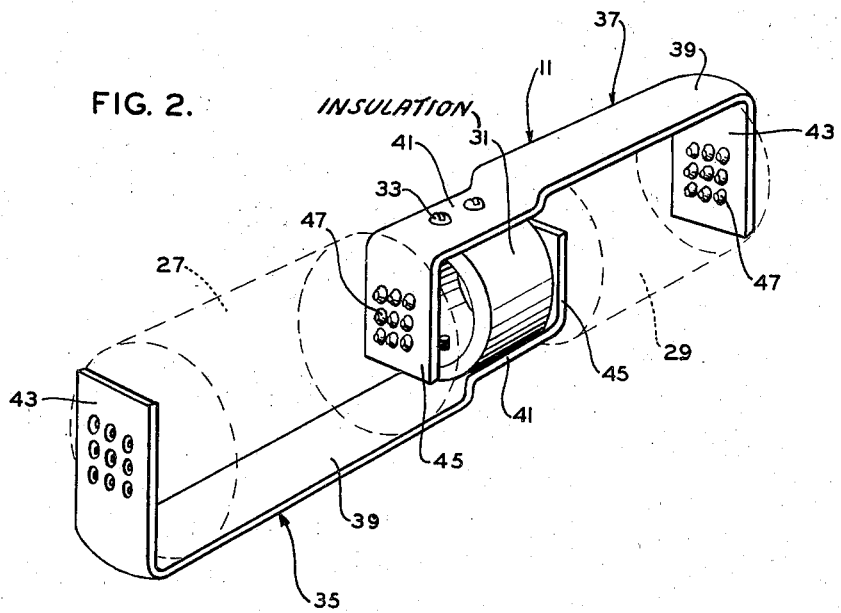

Other objects will become apparent from the following specification and the appended drawings wherein Figure 1 is a longitudinal sectional view of a flashlight provided with a battery mount embodying the present invention; and Figure 2 is a perspective view of said mount, removed from the flashlight case, two cells being shown in operative position by broken lines.

In Figure 1, the battery mount 11 is shown in position in a flashlight 13, which flashlight comprises a cylindrical case 15, a fiber liner 17, a reflector 19, a bulb 21, an end cap 23 and a contact spring 25. Said flashlight 13 is of a type designed to take a single, special type, elongated cell (not shown) extending from the bulb 21 to the contact spring 25. As shown in Figure 1, the said single cell has been replaced by two standard size cells 27, 29, and the battery mount 11.

The said mount 11 is made up of an insulating tube 31 of phenolic material or the like, to which two yokes 35, 37 are fastened as by the machine screws 33. The tube 31 is of a smaller diameter than the cells 27, 29 with which it is to be used, so as to allow room for the heads of the screws 33.

Each yoke 35, 37 is made up of a strip of springy sheet metal, such as spring steel or phosphor bronze. Each yoke 35, 37 is in the general shape of a wide based U. The base comprises two portions, the cell portion 39 and the tube portion 41. The cell portion 39 is transversely arcuate, its radius being the same as that of the outside of the cells 27, 29. The tube portion 41 is also transversely arcuate, its radius being that of the tube 31.

The gripping arms 43, 45 of each U-shaped yoke 35, 37 are disposed at slightly more or less than a right angle to the base at the opposite ends thereof. This is to allow them to be sprung slightly to perpendicular positions when cells 27, 29 are inserted, as will hereinafter appear. Each gripping arm 43, 45 is punched so as to raise several roughened contact protuberances 47 on one surface. Said protuberances 47 are on the inner surface of the gripping arm 43 which is adjacent the cell portion 39, and on the outer surface of the gripping arm 45 which is adjacent the tube portion 41.

The two yokes 35, 37 are secured to diametrically opposite sides respectively of the tube 31 by the screws 33, the cell portions 39 being mutually parallel and extending beyond the ends of said tube in opposite directions, and the gripping arms 43, 45 being in intermeshing relationship so that the gripping arm 45 adjacent the tube portion 41 of each yoke 35, 37 is disposed intermediate the gripping arms 43, 45 of the other yoke. This disposition of the parts results in two cell cradles, one comprising the cell portion 39 and the gripping arm 43 of the yoke 35 and the gripping arm 45 of the yoke 37 and the other comprising the gripping arm 45 of the yoke 35 and the cell portion 39 and the gripping arm 43 of the yoke 37. The distance between the protuberances 47 of the opposing gripping arms 43, 45 of each such cell cradle is just sufficient to allow a cell 27, 29 to be slipped therebetween, whereupon the cell is tightly gripped and good electrical contact is made with its electrodes.

To use the mount herein described, two cells 27, 29 are slipped into place as just explained and as shown in the drawings, the cells being disposed in tandem, and having their positive electrodes oriented in the same direction. When so positioned, the cells 27, 29 are supported mechanically, and the yokes 35, 37 electrically connect the cells in parallel. A unit, made up of two cells 27, 29 and a mount 11 may then be handled like one of the special type, elongated cells, aforementioned. Such a unit is shown in Figure 1 in the flashlight 13. The gripping arm 43 of the yoke 35 makes electrical connection with the end contact of the bulb 21 and the gripping arm 43 of the yoke 37 makes electrical connection with the contact spring 25.

What is claimed is:

1. A battery mount comprising an insulating support, two U shaped yokes of springy electrical conducting material, each yoke comprising a base and two gripping arms disposed substantially perpendicularly to the base, the bases of said yokes being secured to opposite sides respectively of said support, said bases being mutually parallel and said gripping arms being in spaced intermeshing relationship so that one gripping arm of each yoke is disposed between the two gripping arms of the other yoke, the insulating support sustaining the yokes in their relative positions aforesaid and also electrically insulating said yokes from each other so that two battery cells may be wholly sustained by said yokes and connected in parallel on being positioned respectively between and in direct contact with adjacent gripping arms.

2. A battery mount comprising two yokes of electrical conducting material; each yoke having two gripping contact arms of springy electrical conducting material, said arms, in their operative positions, being substantially mutually parallel and in intermeshing relationship, so that one arm of each yoke is interposed between the two arms of the other yoke, and adjacent arms of the two yokes are in mutually opposing relationship, and means to support said yokes in their relative positions as aforesaid, and insulate said yokes from each other.

3. A battery mount comprising a U shaped yoke having a base portion and two gripping contact arms, each arm having a gripping contact surface, the said surfaces on the two arms being oriented in the same direction relative to their respective arms, the said arms being substantially mutually parallel when in their operative positions and both arms being springable slightly in the same direction when released from their operative positions; a second yoke similar to the first yoke; means to support said yokes and insulate them from each other; the four arms of the two yokes being arranged in intermeshing relationship so that one arm of each yoke is positioned intermediate the two arms of the other yoke, and the gripping contact surfaces of the second yoke are oppositely oriented from those of the first yoke, and the said surfaces of adjacent arms of the two yokes are in facing relationship so as to form two opposing pairs thereof so that two cells may be gripped therebetween and electrically joined in parallel.

4. In a mount for two batteries, an insulating support, two yokes secured to opposite sides of said support and wholly supportable thereby, each yoke being made up of electrically conducting material and being substantially U-shaped and including a base and two arms which are springably joined to said base and which extend outwardly from said base at substantially right angles, the two arms of each yoke being provided respectively with gripping contact surfaces facing in the same direction, the said yokes being relatively positioned so that their bases are substantially parallel and so that the proximal arm of each yoke is disposed intermediate the two arms of the other yoke and so that the gripping contact surface on the proximal arm of each yoke opposes the gripping contact surface on the distal arm of the other yoke, so that the two batteries may be positioned respectively with their electrodes in contact with said two pairs of opposing gripping contact surfaces and may be mechanically supported entirely by said yokes and electrically connected in parallel by said yokes.

MORRIS A. SHRIRO.
MICHAEL B. KRAUS, Jr.

REFERENCES CITED

The following references are of record in the file of this patent:

UNITED STATES PATENTS

| Number | Name | Date |
|---|---|---|
| 1,900,906 | Brown | Mar. 14, 1933 |
| 2,293,354 | Munchow | Aug. 18, 1942 |
| 2,377,161 | Le Strange | May 29, 1945 |